LIQUID IMMERSED RECTIFIER ASSEMBLY

Filed May 13, 1964 2 Sheets-Sheet 1

INVENTORS
EDWARD J. DIEBOLD
JOE WISLOCKY
BY FRANK PAULI

OSTROLENK, FABER, GERB & SOFFEN
ATTORNEYS

LIQUID IMMERSED RECTIFIER ASSEMBLY

Filed May 13, 1964 2 Sheets-Sheet 2

INVENTORS
EDWARD J. DIEBOLD
JOE WISLOCKY
FRANK PAULI
BY
OSTROLENK, FABER, GERB & SOFFEN
ATTORNEYS

United States Patent Office // 3,293,349 // Patented Dec. 20, 1966

United States Patent Office 3,293,349

Patented Dec. 20, 1966

3,293,349

LIQUID IMMERSED RECTIFIER ASSEMBLY

Edward J. Diebold, Palos Verdes Estates, Joe Wislocky, El Segundo, and Frank Pauli, Torrance, Calif., assignors to International Rectifier Corporation, El Segundo, Calif., a corporation of California Filed May 13, 1964, Ser. No. 367,052
2 Claims. (Cl. 174—12)

This invention relates to a novel housing structure for electrical devices, and more specifically relates to a novel housing structure for rectifier assemblies wherein the rectifier assemblies are immersed in liquid within a tank which closely confines the rectifier assembly and has at least one flexible wall to permit free expansion and compression of tank volume without building up excessive pressure on the interior of the tank.

High voltage rectifiers of the type shown in copending application Serial No. 105,729, now U.S. Patent 3,217,210, filed April 26, 1961, entitled High Voltage Rectifier Structure, in the name of Edward J. Diebold, and assigned to the assignee of the present invention, are well known to the art. In many applications it is desirable that these devices be mounted with a liquid filled container.

The present invention provides a novel tank or housing for electrical devices of this nature wherein the devices are suspended within the tank primarily by the terminal bushing connectors while the tank is free of internal air space. Moreover, one of the walls of the tank is a flexible wall whereby, when the liquid changes volume due to temperature change, the wall will move in order to permit expansion or contraction of the tank volume. The volume in which the electrical apparatus is immersed is held to a relatively small volume in accordance with the invention, whereby the quantity of liquid within the tank is held to a minimum.

It will be shown that the structure of the particular rectifier apparatus to be housed in the tank, in accordance with the preferred embodiment of the invention, places relatively small demand on the requirement for large insulation distances.

As previously indicated, the novel tank of the invention is provided with at least one large area wall which is flexible in nature. This wall extends beyond the outline of the tank walls perpendicular thereto so that the flexible wall undergoes a relatively small excursion for a given volume change. The space defined by the "overhanging" flexible wall is then substantially completely filled with a novel cooling fin arrangement, thereby providing a highly efficient cooled structure for a relatively small package which handles a relatively large amount of power.

Accordingly, a primary object of this invention is to provide a novel housing for electrical equipment which provides a minimum size, weight and expense with maximum power handling capability.

Another object of this invention is to provide an extremely reliable electrical assembly wherein all live parts of the electrical apparatus are immersed in a liquid insulator.

Another object of this invention is to provide a novel liquid filled tank for housing electrical apparatus which is completely filled with liquid, whereby the housing may be held in any desired position without endangering insulation by having air bubbles in the tank.

A still further object of this invention is to provide a novel hermetically sealed tank for housing electrical apparatus wherein at least one side of the tank is formed of a large and flexible bellows to insure free expansion and compression of liquid within the tank.

Still another object of this invention is to provide a novel method of mounting a flexible diaphragm wall for the tank of electrical apparatus whereby the relatively fragile flexible wall is spaced from a mounting surface so that the flexible wall may always move freely.

Still another object of this invention is to provide a novel tank structure for electrical apparatus wherein substantially the entire available volume within the outline of the device is filled with cooling fins without purposely increasing the outline of the apparatus.

Yet another object of this invention is to provide a novel assembly of electrical equipment and a housing therefor wherein feed-through insulators are arranged to serve as supports for the electrical apparatus, thus eliminating creepage and arc flashover internally of the tank or between the assembly and the tank.

These and other objects of this invention will become apparent from the following description when taken in connection with the drawings, in which.

Figures 1, 3:
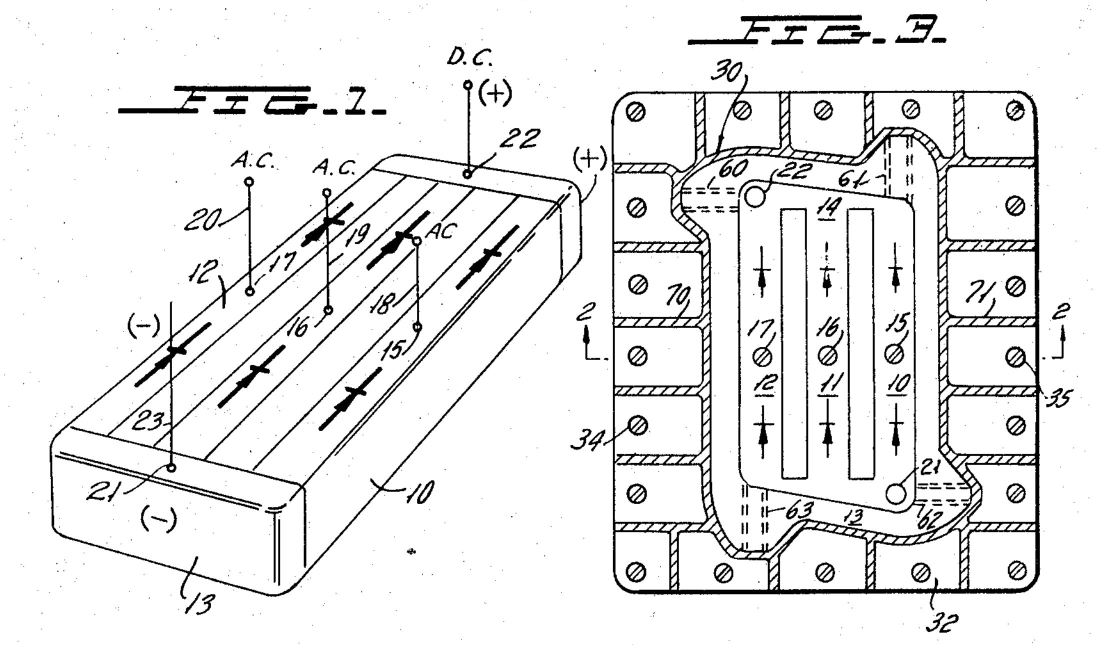
FIGURE 1 shows a perspective diagram of a three-phase full wave bridge connected rectifier structure which may be mounted within the tank of the invention.
FIGURE 3 is a cross-sectional view of the tank of FIGURE 2 taken across the lines 3—3 in FIGURE 2.

Referring first to FIGURE 1, there is illustrated a three-phase, full wave bridge connected rectifier assemblage constructed in accordance with the disclosure of U.S. Patent 3,217,210, which is incorporated as a part of the instant application.

As is fully described in the above noted application, the assembly of FIGURE 1 includes three columns 10, 11 and 12 of series connected diode elements along with suitable voltage distributing means therefor. Each of the columns then terminates in two smooth common electrodes 13 and 14 which define the negative and positive terminals of the device.

Center taps such as taps 15, 16 and 17 are then made to the center of each of columns 10, 11 and 12, respectively, and serve as terminals for three A.-C. leads 18, 19 and 20, repectively, which are connectable to any suitable three-phase power source. Electrodes 13 and 14 then provide a suitable connection means 21 and 22, respectively, which are connectable to D.-C. leads 23 and 24, respectively.

Accordingly, the device defines a three-phase, full wave bridge connected rectifier structure with the schematic representation of a diode indicating each of the bridge arms in FIGURE 1.

The unit described in FIGURE 1, and as described in further detail in the above noted copending application, defines a mechanically self-supporting unit constituted by the three insulating columns which support the diodes on members 10, 11 and 12 along with the rigid end pieces 13 and 14 which may be shaped at will.

There are many applications for such a device in which the rectifier is preferably immersed in a liquid which serves as an insulator coolant and as protection against severe environments. Moreover, for three-phase rectification where a structure such as that of FIGURE 1 is used, the system will only require five insulated terminals for the conductors 18, 19, 20, 23 and 24. These terminals may then be all arranged on the same side of the assembly, as illustrated in FIGURE 1.

While the following description of the novel tank structure of the invention is applicable generally to any type of electrical equipment, it is particularly well suited for apparatus of the type shown in FIGURE 1. Thus, the structure of FIGURE 1 is ideally suited to liquid immersion, since it is extremely compact and will save much space within the liquid vessel.

Moreover, because of the common polarity at the ends of each of columns 10, 11 and 12, no insulation distance is required between the columns. In the center of the columns in the region of terminals 15, 16 and 17, the only insulation required is flashover insulation as distinguished from creepage insulation which requires much more distance.

It will, therefore, be recognized that when a liquid having good insulation properties is used within a tank receiving the equipment of FIGURE 1, the tank may be made extremely small.

Figure 2:
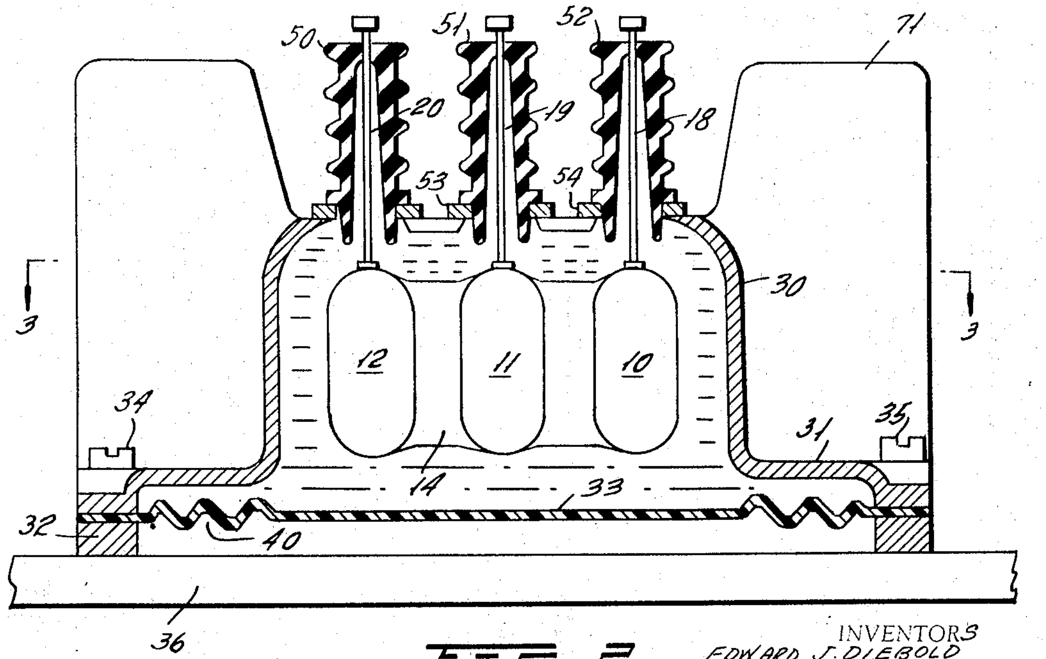
FIGURE 2 is a cross-sectional view of the tank of the present invention when mounting the electrical apparatus of FIGURE 1, and is a cross-sectional view of FIGURE 3 across lines 2—2 in FIGURE 3.

Referring now to the novel tank structure and particularly the FIGURES 2 and 3, there is illustrated therein a tank which has a cast dome section 30 which may, for example, be of aluminum, and has an extending flange portion 31. A rectangular frame 32 (FIGURE 4) having suitable openings around the periphery thereof then receives the outer portion of flange 31, as illustrated, with a flexible wall 33 interposed between frame 32 and flange 31.

A plurality of mounting screws such as mounting screws 34 and 35 then extend through suitably aligned openings in flange 31, flexible wall 33 and frame 32 and into a main support plate 36.

It will be noted that the frame 32 spaces flexible wall 33 from support plate 36 so that wall 33 is always free to expand. Suitable gasket means (not shown) may then be used to insure a hermetically sealed connection between flexible wall 33 and flange 31. The flexible wall 33 may be made in any desired manner, but is preferably provided with corrugations such as the corrugations 40 (FIGURES 2 and 4) which permit wal 33 to have a bellows-like action. The flexible wall 33 is formed of a material sufficiently thin so that it can undergo expansion and contraction as fluid which fills the interior of the tank expands and contracts to the temperature change.

Moreover, the wall 33 is preferably made of a relatively soft and resilient plastic such as polytetrafluorethylene whereby electrically live parts in the vicinity of the diaphragm need no particular safety distance because the diaphragm itself is an excellent electrical insulator. This is particularly valuable at very low temperature when contraction of the liquid within the tank will bring the diaphragm immediately adjacent the equipment within the tank. Clearly, the diaphragm may be made of a wide range of materials which includes polyethylene, polypropylene or polytrifluoro-tetrafluorethylene.

The electrical apparatus which may be of the type described in FIGURE 1 is then mounted within the tank as shown in FIGURES 2 and 3 with relatively little distance between the interior of the tank walls and the rectifier equipment.

More specifically, the top of the tank is provided with five openings which receive suitable insulator bushings. Three of these bushings are illustrated in FIGURE 2 as bushings 50, 51 and 52 which are suitably secured and sealed to the tank body 30. These bushings then receive the electrical conductors 18, 19 and 20 which extend from terminals 15, 16 and 17 of the electrical apparatus. Moreover, these bushings provide a main support function for supporting the apparatus within the tank.

Two additional openings, illustrated in FIGURE 2 as openings 53 and 54, then serve to receive the D.-C. terminals extending from terminals 21 and 22 of the device and are associated with suitable bushings (not shown).

As previously indicated, the interior of the tank is then completely filled with a suitable insulation oil, or other field, leaving no air space within the tank. Clearly, volumetric changes of the fluid within the tank are absorbed by expansion or contraction of diaphragm 33.

In order to provide laterial stability to the electrical apparatus, tubular insulators, shown in FIGURE 3 as insulators 60, 61, 62 and 63, extend from the electrical apparatus to the interior of casting 30. In order to increase creepage distance and avoid electrical flashover along insulators 60 through 63, the tank shape is preferably made deeper where inslators 60, 61, 62 and 63 are to be connected to the tank.

In the formation of casting 30, a large flange 31 is intentionally provided so that the flexible diaphragm 33 will have a large area and thus undergo a relatively small excursion during expansion and the contraction of the volume of fluid within tank 30.

Since this flange 31 defines the smallest rectangular outline of the tank, the presence of the flange is taken advantage of by providing cooling fins such as fins 70 and 71 which completely fill the outline of the tank as defined by flange 31. This provides a substantial amount of cooling which is necessary in the present invention because of the very high power concentration which is placed in a very small space. Note that this concentration of power is advantageous in reducing the possibility of electrical flashover and reduces the volume of expansion of liquid. This same decrease in size, however, reduces the cooling capability of the tank whereby the filling of the rectangular outline of the tank with cooling fins as determined by the size of the diaphragm 33 permits extremely efficient cooling without providing unnecessary space for the cooling fins. Note that the cooling fins of the drawings may be cast integrally with tank 30, or separately, with the fins being joined to the casting 30 by a dip-soldering operation.

Figure 4:
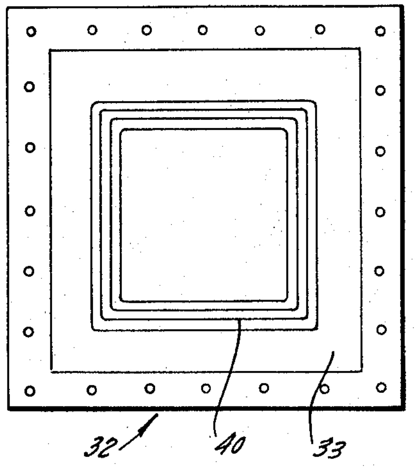
FIGURE 4 is a plan view of the bellows wall of FIGURE 2.

While FIGURES 2, 3 and 4 illustrate the novel tank structure of the invention for the support of the electrical apparatus of FIGURE 1, it will be apparent that other types of apparatus may be combined with the novel tank of the present invention.

Figure 5:
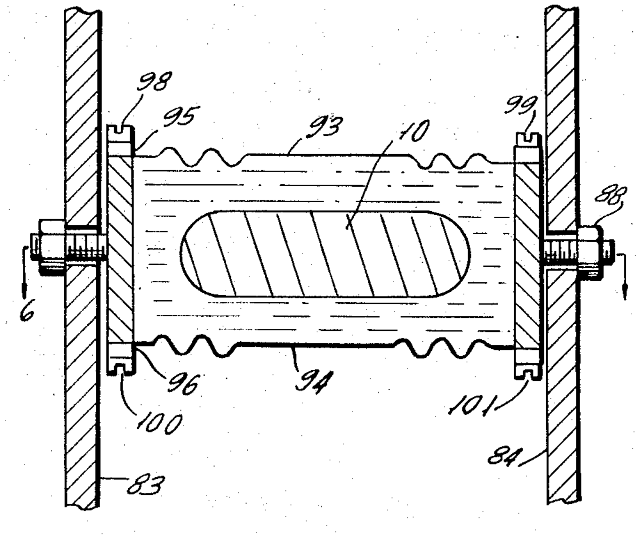
FIGURE 5 is a cross-sectional view of a second embodiment of the invention wherein a single phase rectifier structure is housed within a tank constructed in accordance with the invention.
Figure 6:
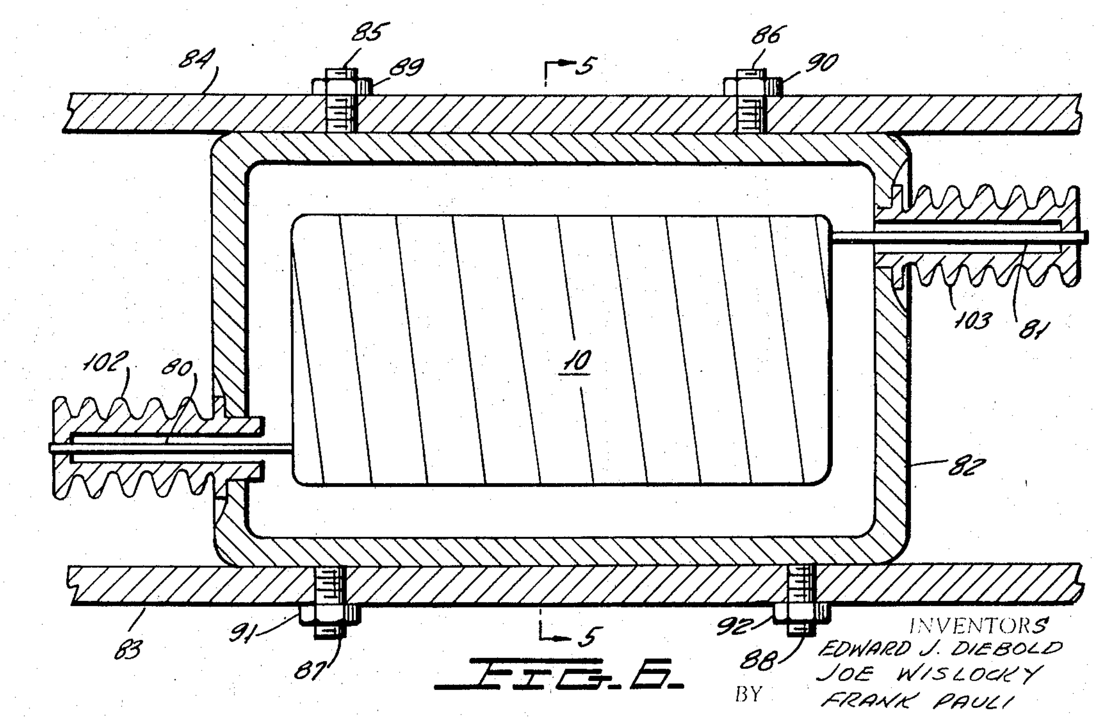
FIGURE 6 is a cross-sectional view of FIGURE 5 taken across the lines 6—6 in FIGURE 5.

As another example of the present invention, FIGURES 5 and 6 illustrate the manner in which a single rectifier stack—for example, the single column 10 of FIGURE 1—may be supported within a mounting structure in accordance with the invention.

Referring now to FIGURES 5 and 6, we have illustrated therein the single rectifier stack 10 having output terminals 80 and 81 (FIGURE 6). The main support tank is then formed of the four-sided tank structure 82 (FIGURE 6) which is supported between suitable mounting plates 83 and 84 by a suitable nut and bolt arrangement such as the studs 85, 86, 87 and 88 (which may be integral with body 82) which are captured by nuts 89, 90, 91 and 92, respectively.

The tank is then completed by upper and lower diaphragm walls 93 and 94, respectively (FIGURE 5). The diaphragm walls 93 and 94 are connected to the main tank structure 82 by suitable frame members such as frames 95 and 96 which may each be similar to frame 32 of FIGURE 2 and are held in position by a suitable plurality of threaded members such as the screws 98, 99, 100 and 101. Clearly, the diaphragms 93 and 94 will serve to expand and contract responsive to volumetric changes in the liquid filling the interior of the support tank.

The rectifier or other similar electrical apparatus is then supported within the tank by means of the electrical conductors 80 and 81 which extend through insulator bushings 102 and 103 which extend through the wall of tank 82 in the usual manner.

The embodiment of FIGURES 5 and 6 particularly illustrates that more than one diaphragm wall could be used. Moreover, in the embodiment of FIGURES 5 and 6, the cooling action takes place preferably through induction into conductive mounting plates 83 and 84.

Although this invention has been described with respect to its preferred embodiments, it should be understood that many variations and modifications will now be obvious to those skilled in the art, and it is preferred therefore that the scope of the invention be limited not by the specific disclosure herein, but only by the appended claims.

The embodiments of the invention in which an exclusive privilege or property is claimed are defined as follows:

1. A tank for housing electrical equipment, said tank comprising:

a main dome section including upstanding side walls and an enlarged flange extending transverse thereto thereabout, the cross-sectional area defined within said upstanding side walls being less than the total area defined within said upstanding side walls plus the area of said flange;

a flexible wall secured to said flange at its outermost periphery to define a completely sealed volume, said volume being filled with fluid, said flexible wall lying in a plane which is parallel to said flange but spaced therefrom such that an area of said flexible wall which is equal to said total area will be exposed to said fluid;

whereby said flexible wall will experience less movement in compensating for a given volumetric change in said volume in response to expansion or contraction of said fluid than if the area of said flexible wall which were exposed to said fluid were equal to said area defined within said upstanding side walls.

2. The tank as set forth in claim 1, which includes a substantially flat mounting surface and a frame member; said flexible wall being interposed between said flange and said frame; a plurality of securing means extending through said flange, said flexible wall, said frame and into said mounting surface; said flexible wall being spaced from said mounting surface by the thickness of said frame thereby being free to expand by at least the distance defined by the thickness of said frame.

References Cited by the Examiner

UNITED STATES PATENTS

| | | | |
|---|---|---|---|
| 2,545,962 | 11/1948 | Brown | 174—12 |
| 2,768,261 | 10/1956 | Mathisen | 92—104 X |
| 2,903,500 | 9/1959 | Newell et al. | 174—12 |
| 3,069,615 | 12/1962 | Jensen | 174—15 X |
| 3,096,390 | 7/1963 | Deniav | 174—15 X |

FOREIGN PATENTS

| | | |
|---|---|---|
| 255,034 | 1/1927 | Great Britain. |
| 580,089 | 8/1946 | Great Britain. |
| 593,533 | 10/1947 | Great Britain. |

LEWIS H. MYERS, *Primary Examiner.*

LARAMIE E. ASKIN, ROBERT K. SCHAEFFER, *Examiners.*

J. F. RUGGIERO, *Assistant Examiner.*